F. F. WEAR & R. MORGENEIER.
POWER DRIVEN MEAT SAW.
APPLICATION FILED JAN. 29, 1910.
1,031,217.
Patented July 2, 1912.
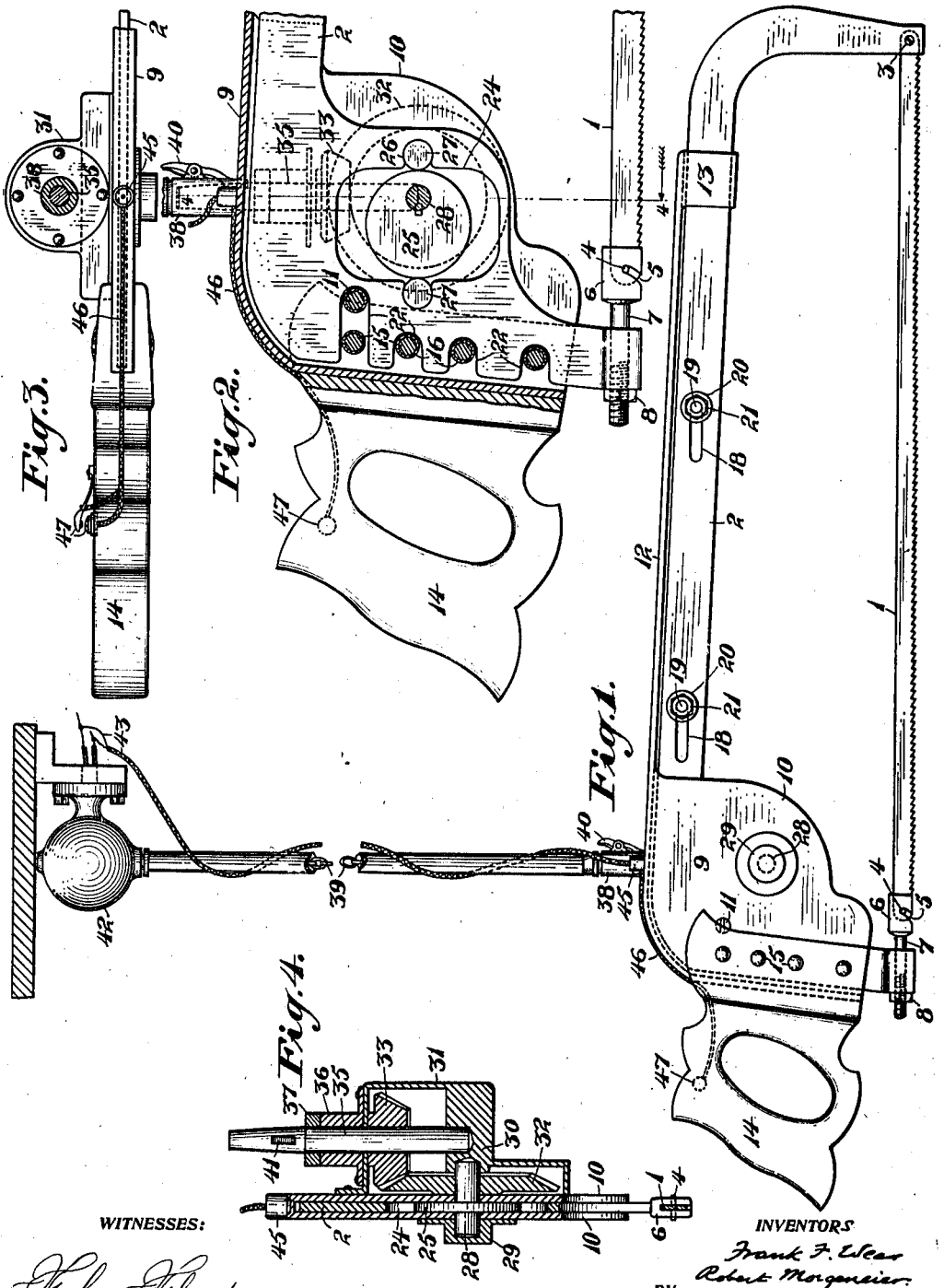
WITNESSES:
F. C. Fliedner
N. B. Keating
INVENTORS
Frank F. Wear
Robert Morgeneier
BY
F. M. Wright
ATTORNEY

UNITED STATES PATENT OFFICE.

FRANK F. WEAR, OF SAN FRANCISCO, AND ROBERT MORGENEIER, OF OAKLAND, CALIFORNIA; SAID MORGENEIER ASSIGNOR TO SAID WEAR.

POWER-DRIVEN MEAT-SAW.

1,031,217.

Specification of Letters Patent.

Patented July 2, 1912.

Application filed January 29, 1910. Serial No. 540,821.

*To all whom it may concern:*

Be it known that we, FRANK F. WEAR and ROBERT MORGENEIER, citizens of the United States, residing, respectively, at San Francisco, in the county of San Francisco, and Oakland, in the county of Alameda and State of California, have invented new and useful Improvements in Power-Driven Meat-Saws, of which the following is a specification.

The object of the present invention is to provide an electrically operated saw, and especially a saw adapted for cutting bones in butcher shops or the like, which will be convenient in use and effective in operation.

In the accompanying drawings, Figure 1 is a side view of the saw suspended from a motor; Fig. 2 is an enlarged broken side view of the end of the saw adjacent to the handle; Fig. 3 is an enlarged plan view of Fig. 2; Fig. 4 is a cross section on the line 4—4 of Fig. 2.

Referring to the drawing, 1 indicates the blade of the saw, secured to the saw frame 2 at the front end by a screw 3 and at the rear end by a pin 4 in a slot 5 of a forked tension head 6, which has a stem 7 passing through the other end of the saw frame, being adjusted the required tension therein by a nut 8 screwed on said stem.

9 indicates the casing for the saw frame, formed with side plates 10 extending on each side of the rear end of the frame and secured together by a screw 11, one of said plates having an extension 12 reduced in width to be substantially the same width as the frame and extending along the side, and over the top edge, but, at the front end, extending over both sides for a short distance, as shown at 13. To said casing is attached the handle 14 by screws 15. Said screws 11 and 15 are provided with spreaders 16 to space the sides of the casing apart.

By means to be presently described, the saw frame is given a reciprocating motion in said casing, and, for the purpose of guiding the same in its reciprocating motion, there are formed in the back of the saw frame, slots 18, through which pass screws 19, which also pass through the side of the casing adjacent thereto, washers 20 being secured upon said screws by nuts 21. The saw frame is also formed at the end with open-ended slots 22 to permit it to reciprocate, notwithstanding the screws 11, 15, which connect the two sides of the casing. Since these slots are open-ended it will be seen that the saw frame can readily be removed from the casing by unscrewing the nuts 21 and removing the screws 19.

The rear portion of the saw frame is formed with an elongated opening 24 for an eccentric 25. From each side of said eccentric opening there are two circular extensions 26, which contain steel disks 27 against which the eccentric bears when imparting reciprocation to the saw frame. Said eccentric is mounted on a shaft 28, which passes through the sides of the casing, one end being received in a bearing 29 secured on one side of the casing, and the other end having a step bearing in a block 30 secured within a housing 31 attached to the other side of the casing. Said shaft is driven by a bevel gear 32 thereon, meshing with a bevel gear 33, both of said gears being contained within the housing 31, and the gear 33 being mounted on a vertical shaft 35 having a step bearing in the block 30 and rotating in a bearing 36 outside the housing. A collar 37 is secured to said shaft and retains the same in position. The upper end of said shaft is tapered to fit within a tapering socket 38 attached to a flexible shaft 39 and removably attached to the shaft 35 by a spring latch 40 which enters a groove 41 in the tapering part of said shaft. Said flexible shaft is driven by an overhead electric motor 42 and serves when attached to the saw, not only to operate, but to suspend, the saw.

The conducting wires 43 closing the circuit through the motor are connected respectively with contacts of a socket which fits over a plug 45, said plug being connected by wires 46 to the contacts of a push button 47 on the left side of the handle, within easy reach of the thumb when grasping the handle. Since the handle and the main portion of the casing and saw are on opposite sides of the point of suspension thereof, the apparatus when suspended and not in use hangs in a position ready for immediate use.

The mode of operation of the device will be readily understood from the foregoing description. The butcher takes hold of the saw by means of the handle and advances the saw through the meat. As the saw advances it reciprocates very rapidly and performs the necessary sawing action.

At any time the butcher can stop the reciprocation of the saw by removing his thumb from the push button, and, if he so desires can use a saw as an ordinary butcher's saw. Or if necessary he can remove the saw entirely from the flexible shaft and use it as an ordinary butcher's saw.

We are aware that it has been proposed, as in the patent to Ludewig, No. 812,507, to connect a shaft for operating a reciprocating tool, as that of a surgical operating engine, with a flexible shaft driven by a motor, but, so far as we are aware, no one has heretofore provided a construction in which a saw can be guided in its usual operative position, and be driven by a flexible shaft from a motor, and likewise suspended by said shaft. We obtain this novel result by arranging a shaft 35 as close as possible to the saw 2, and parallel with the plane of said saw, and at right angles to the direction of reciprocation thereof; also by placing said shaft 35 in the casing so that the handle and the greater portion of the casing and saw are on opposite sides of said shaft, or, more accurately speaking, on opposite sides of a vertical plane transverse to the saw and extending through said shaft. By this construction the saw hangs freely in a position as nearly as possible balanced for use.

We claim:—

1. In a power-driven saw, the combination of a motor, a flexible shaft connected thereto and suspended therefrom, a casing, a handle connected thereto, a shaft carried by the casing, a saw guided by the casing so as to be reciprocable in a plane parallel to said shaft and in a direction at right angles thereto, an operative connection between said latter shaft and saw whereby, from the rotary motion of the shaft, reciprocating motion is imparted to said saw, the outer end of said shaft being connected to the flexible shaft, and said handle, and the greater part of the casing and saw being on opposite sides of a plane transverse to the saw and extending longitudinally through said shaft.

2. The combination of a casing comprising two side plates spaced from one another, a handle secured to said casing, a saw frame in said casing having an elongated opening therethrough, said opening having two circular extensions, steel disks in said extensions, a shaft passing through the sides of the casing and mounted in bearings secured on said sides, an eccentric on said shaft between said side plates and bearing against said steel disks, a beveled gear on said shaft outside said casing, a motor, a second shaft driven by said motor, and a beveled gear thereon meshing with the first-named beveled gear, substantially as described.

In testimony whereof we have hereunto set our hands in the presence of two subscribing witnesses.

FRANK F. WEAR.
ROBERT MORGENEIER.

Witnesses:
 FRANCIS M. WRIGHT,
 D. B. RICHARDS.